Dec. 3, 1929.　　　F. FOGARTY　　　1,738,238
HARVESTING MACHINE
Filed Dec. 19, 1924　　6 Sheets-Sheet 1

Inventor:
Francis Fogarty
by C. P. Goepel
Attorney

Patented Dec. 3, 1929

1,738,238

UNITED STATES PATENT OFFICE

FRANCIS FOGARTY, OF ADELAIDE, AUSTRALIA

HARVESTING MACHINE

Application filed December 19, 1924, Serial No. 756,876, and in Australia December 20, 1923.

This invention relates to improvements in harvesting machines and refers especially to harvesting machines of the type known as "side draught" harvesters, wherein the draught animals or tractors are attached to one side of the main frame and the operative mechanism is driven from the near side main wheel of the machines.

The object of the present invention is to provide means whereby the tendency of horse or tractor drawn harvesting and like machines constructed on the "side draught" principle to turn sideways will be counteracted and the machines having reaping or stripping mechanisms of more than ordinary width will keep in a correct line with the draught.

I accomplish the above mentioned object by providing the support for the steering wheels with forwardly projecting arms or the like connected by a cross bar having a loose connection with a tongue pivoted at its rear end to the main frame behind the pivot of the steering wheels and connected at its front end to a transverse draught bar which is connected at the near side end to a draught member having its rear end secured to the near side of the main frame and its opposite end connected by a flexible member to a bridle secured to the off side part of the main frame. The draught bar is supported on the tongue and in looped members or slotted bars fitted to the frame.

In order that the invention, the object and nature of which have been set forth, may be clearly understood, reference will now be had to the explanatory sheets of drawings wherein:—

Figure 1:
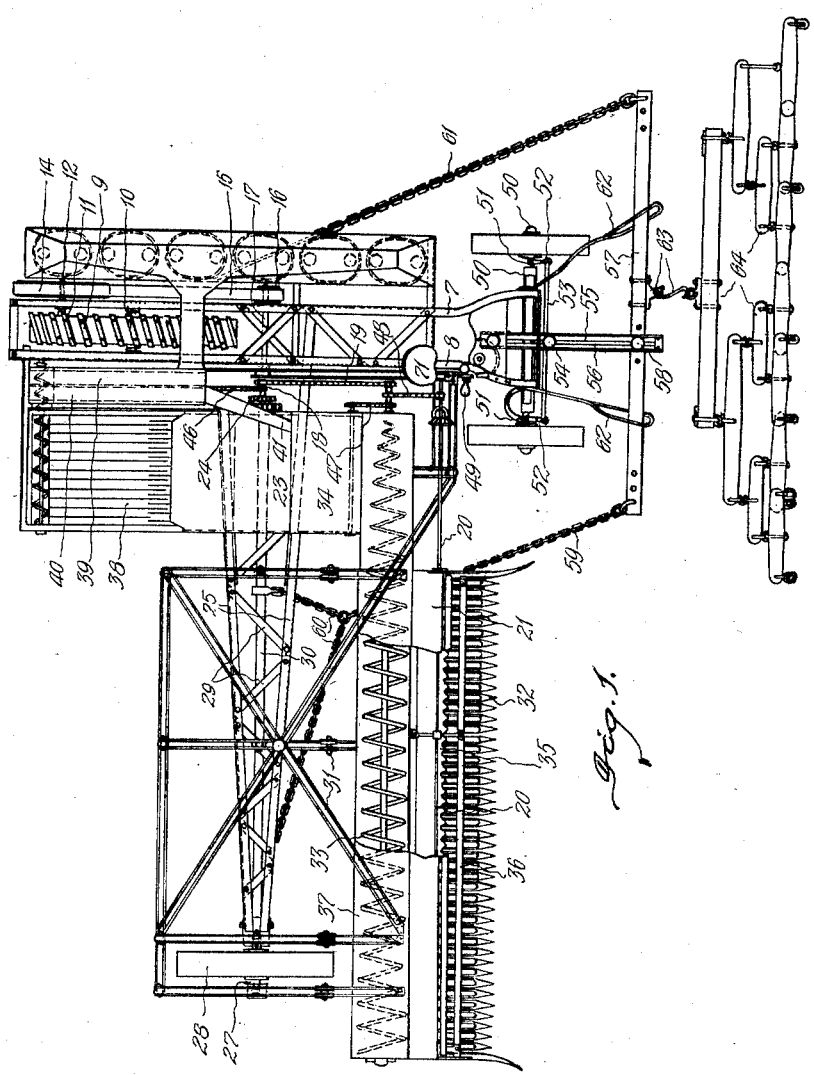
Figure 1 is a view in plan of a harvester filled with draught gear constructed in accordance with the present invention.

In the drawings the numerals 7 and 8 designate longitudinal side members of the main frame which are extended rearwardly and each comprise a pair of parallelly arranged beams which are rigidly connected to each other by stays 13 to ensure rigidity of construction. Secured to the inside of the longitudinal members of the main frame in advance of the bull wheel 9 are the ends of two or more converging beams 25, the opposite ends of which are provided with a bearing or support 26 for a stub axle 27 upon which is mounted the off side transport wheel 28. A transverse shaft 30 is supported by the converging beams and the movable frame 31 of the reaping and conveying mechanism is pivoted on the said transverse shaft 30.

The front end of the pivoted frame 31 supports a comb 32, beater drum 21 and conveying mechanism 33 and the material harvested is carried by an elevator 34 or the like to the thresher drum 23 or other suitable threshing device.

The front end of the main frame is supported on a forecarriage 50 and the offside transport wheel 28 preferably is of smaller diameter than and is disposed in advance of the bull wheel, as illustrated.

The disposition and size of the offside transport wheel 28 is such that the tendency for the machine to turn into the crop is minimized and the operative parts will be supported at a much lower elevation on the machine.

The front wheels of the forecarriage 50 are mounted on stub axles formed on posts 51 pivotally supported on the front of the main frame.

The posts 51 are provided with forwardly projecting arms 52 which are connected by a cross bar 53 having a stud 54 projecting upwardly from the center thereof and arranged to be loosely engaged by a slot 55 in a steering tongue 56 having its rear end pivoted to the front part of the main frame at the rear of the said axle.

A transverse draught bar 57 is furnished with a vertical pivot pin 58 which is engaged by the slot 55 in the forward end of the tongue 56 and the inner end of the said draught bar is connected by a flexible member 59 to the offside portion of the converging beams 25 supporting the stub axle of the offside transport wheel 28.

The flexible member 59 passes rearwardly from the draught bar and is connected to the apex of a bridle 60 which is connected at two points to the shaft 30 passing centrally through the said converging beams.

The flexible member 59 passes underneath the beater drum and reaping and conveying mechanism.

The outer end of the transversely disposed draught bar 57 is connected by a member 61 to a rear part of the main frame and the said members 59 and 61 are disposed at an angle to the line of draught and preferably as illustrated in Figure 1 of the drawings.

The slot 55 in the tongue 56 is made sufficiently long to prevent the pin 58 contacting with the front end thereof when a hauling strain is applied to the transverse draught bar 57.

A pair of looped supports 62 loosely engage the transverse draught bar on both sides of the tongue 56 and support the same in a horizontal position. The looped supports 62 for the draught bar enable the latter to move forwardly and rearwardly when the reaping and stripping mechanism is raised and lowered, and moreover, the looped supports permit the steering wheels to turn freely when a tractor or draught animals are turning at headlands or the like.

The draught bar 57 is fitted with a shackle 63 or other suitable device for enabling swingletrees 64 to be attached thereto when the front of the main frame is mounted on a pair of steering wheels as above described.

The said steering wheels will be easily controlled by the draught and they will turn slightly in advance of the angle assumed by the line of draught thereby facilitating the negotiation of turns when the machine is working in a field or is being transported from place to place.

The invention can be adapted to be drawn by a tractor of the type wherein all the wheels are driven and each pair of wheels is mounted on a separate body, the power unit being mounted on one body and power transmitted therefrom by propeller shafts connected by universal couplings. When this type of tractor is used to draw the machine the forecarriage 50 and front part of the longitudinal members of the main frame are removed as shown in Figure 2 of the drawings and the rear part of the tractor is connected to the front end of the said main frame by means of a universal joint.

Figure 2:
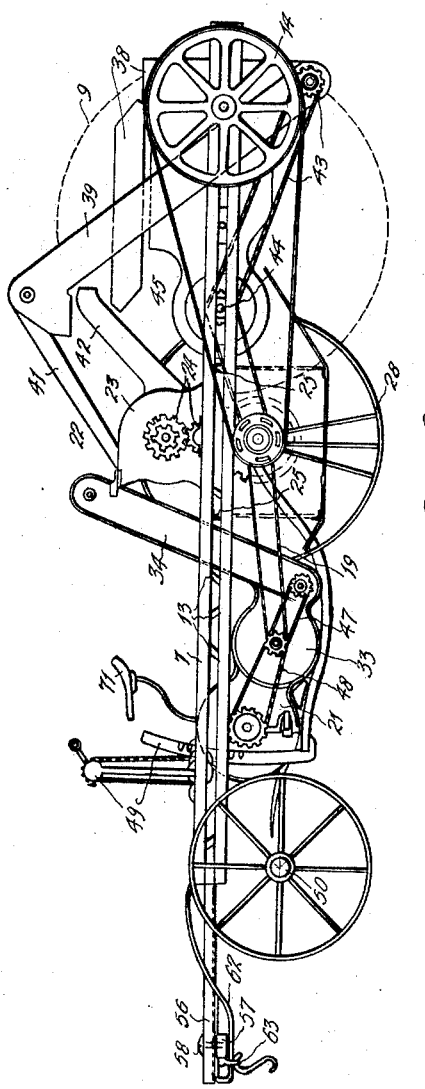
Figure 2 is a view similar to Figure 1 and shows the means employed for adapting a tractor of the type in which the four wheels are driven to the hauling of the same and Figure 3 is a view in side elevation of Figure 2.
Figure 3:
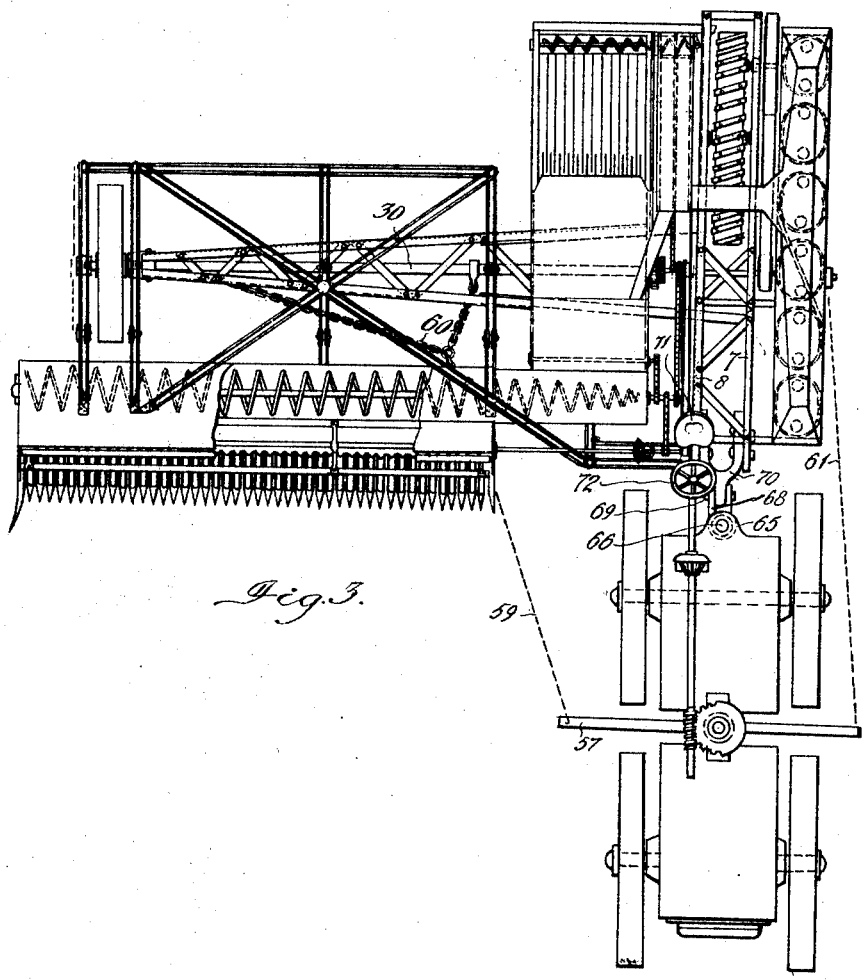

In Figures 2 and 3, the tractor is shown diagrammatically and the rear end of the tractor is fitted or formed with bracket 65 adapted to take a vertical pivot pin 66 upon which is mounted a sleeve 67 having trunnions to which are fitted the forward ends of links 68. The rear ends of the links 68 are pivotally mounted on laterally projecting pins 69 passing through a bracket 70 fitted to the forward end of the fore-shortened longitudinal frame members.

The transverse draught bar 57 in this instance is supported horizontally below or above the center turning point between the two pair of wheels of the tractor and the ends of the draught bar are connected by the flexible members 59 and 61 to the main frame of the implement as hereinbefore described.

In order to enable the steering of the tractor to be controlled by the driver from the seat 71, the steering column is arranged so that the hand steering wheel 72 is located adjacent the driver's seat, in all other respects, the tractor is constructed and controlled in the ordinary way.

This method of combining a tractor with or connecting a tractor to a harvester by the simple means of removing the forecarriage of the harvester and hitching to the tractor by a specially designed universal joint makes the combination exceedingly easy to operate and short turns and uneven ground to be negotiated without difficulty. The harvester frame, more especially the transverse trussed frame and stripping or reaping mechanism is capable of being extended to any desirable width in order that a very wide swathe of crop may be taken without in any way interfering with the line of travel of the whole unit.

Figure 4:
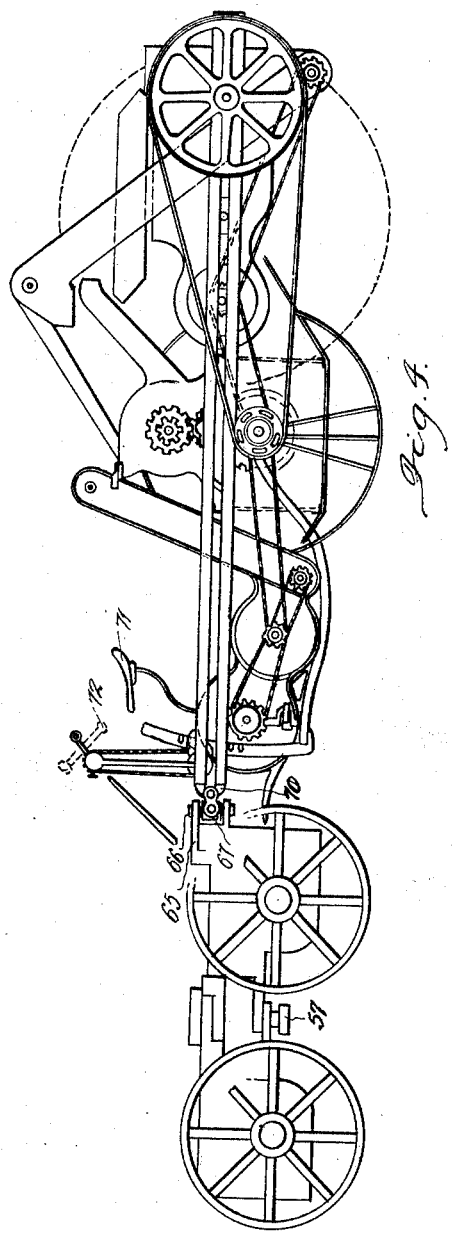
Figures 4 and 5 are views similar to Figures 2 and 3, and show the method of attaching an ordinary tractor to a harvester.
Figure 5:
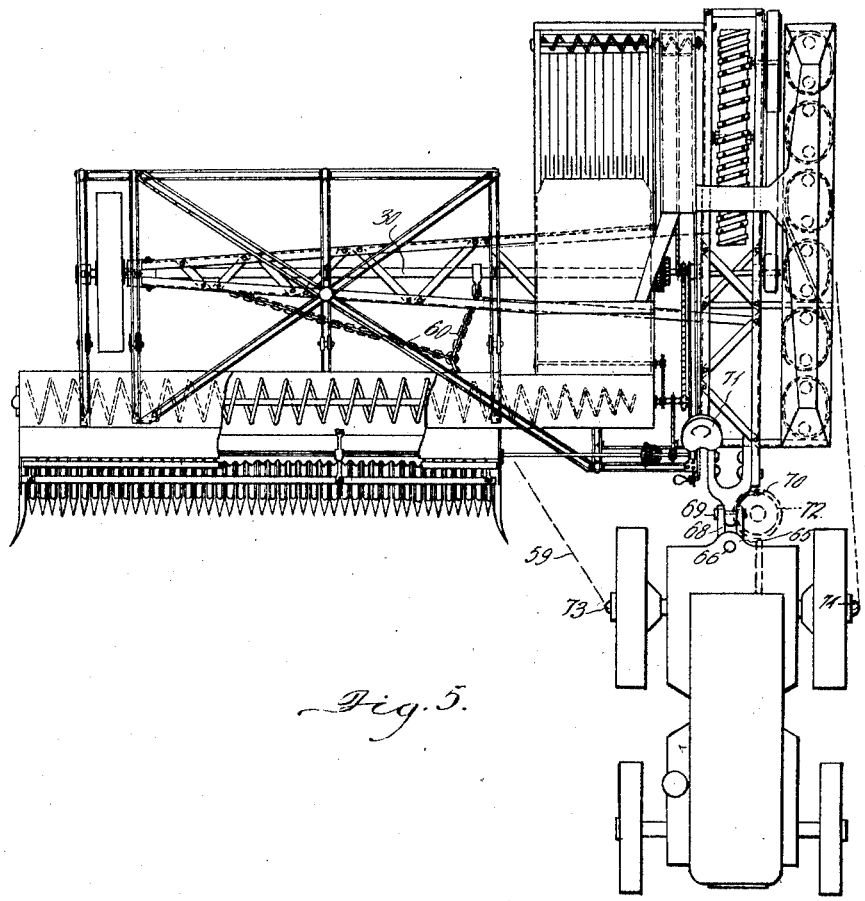
Figure 6:
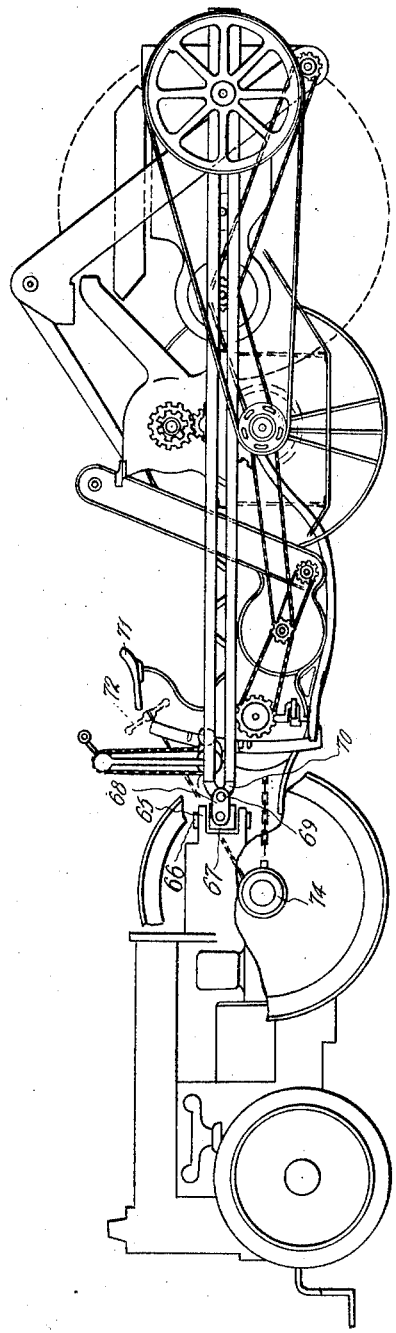
Figure 6 is a view in side elevation, with parts broken away, showing the coupling connection between another type of tractor and the harvester.

When it is desired to use a tractor of a type other than that described with a harvesting machine, the two front steerable wheels of the harvester and the front portion of the longitudinal main frame is removed and a bracket and universal joint on the harvester frame are connected to a bracket on the tractor as hereinbefore described (see Figures 4 and 5). It will be seen that by this method the rear of the tractor is brought very close to the driver's seat or in other words the two rear wheels of the tractor become in effect the two front leading wheels of the harvester, steering therefore is accomplished without any alteration to the mechanism of the tractor or to any portion of the mechanism of the harvester.

In order to secure the tractor and obtain an even line of draught, the flexible member 59 is arranged to extend from the shaft 30 to the offside of the tractor frame and preferably to the wheel cap 73 on the axle of the offside rear wheel. A flexible or a rigid member 61 passes from the near side of the main frame to the near side of the tractor frame and preferably to a wheel cap 74 on the near side end of the rear axle.

The universal coupling connecting the forward end of the harvester frame to a bracket at the rear of the tractor allows of a lateral as well as a perpendicular movement and is so arranged that in addition to the rear portion of the tractor frame acting as an anchor for the forward end of the harvester frame its members hold in a firm position the forward ends of the harvester, thus making a perfectly strong joint capable of movement in any direction.

Before operations are commenced the draught chains connecting the harvester frame to the tractor are adjusted in order that little or no strain will be placed on the universal joint.

The moment of resistance in the off side main wheel is not greater than the center of weight of the combined units and side strain is obviated, due more especially to the fact that the said wheel is made to revolve at a uniform rate of speed with the other wheels of the harvester. Little or no alteration to the steering mechanism of the tractor is needed and the combined units move forward or backward at the will of the operator, the hand steering wheel of the tractor being placed close to the seat of the harvester so that one man can easily control both the tractor and the harvester.

Whilst the invention is directed more particularly to the provision of means for operatively connecting a tractor and a harvesting machine of the type above described it is not intended that the application of the invention should be so limited as it may be readily applied in connecting other types of tractors to the same or to a different kind of harvester.

Some or all of the improvements hereinbefore mentioned are applicable to existing types of stripper harvester, reaper thresher, and like machines, and they can be readily adapted to these machines without having to depart materially from the construction outlined in the foregoing specification.

I claim:—

1. In a stripper harvester or reaper thresher machine, a main frame, a pair of main transport wheels supporting the rear and off-side of the main frame, a pivoted fore-carriage supporting the front of the main frame, a draught bar connected to and disposed transversely in front of the forecarriage, a bridle fitted to the main frame between the transport wheels, a flexible connection between the offside end of the draught bar and the bridle, and a draught connection between the near side end of the draught bar and the near side of the main frame.

2. In a stripper harvester or reaper thresher machine, a main frame, a steering tongue pivoted to and projecting forwardly from the main frame, a draught bar movably supported on a steering tongue, a flexible connection between the offside end of the draught bar and the offside part of the main frame, and a draught connection between the near side end of the draught bar and the near side and rear part of the main frame.

3. In a stripper harvester or reaper thresher machine, a main frame supported on a bull wheel and an off-side transport wheel and on front steering wheels, a pivoted frame, crop gathering mechanism on the pivoted frame, a slotted steering tongue pivoted to and projecting forwardly from the front end of the main frame, a movable connection between the slotted tongue and the pivotal supports for the steering wheels, a transverse draught bar slidably connected to the forward end of the pivoted tongue, a flexible connection between the offside end of the draught bar and the off-side of the main frame, said flexible connection passing beneath the crop gathering mechanism, and a connection between the near side end of the draught bar and the rear of the main frame on the near side thereof.

4. In a stripper harvester or reaper thresher machine, the combination with the subject matter of the preceding claiming clause 3, of longitudinally disposed members on the near side of the main frame, looped shaped members fitted to and projecting forwardly from the front end of the longitudinal members and adapted to loosely engage the draught bar on both sides of the slotted tongue.

5. In a stripper harvester or reaper thresher machine, a main frame having its near side supported on a bull wheel and front steering wheels of a fore-carriage and its offside supported on a transport wheel located in advance of the near side transport wheel, stub axles supporting the steering wheels, vertical pivot posts carrying the stub axles, arms projecting forwardly from the said pivot posts, a link connecting the said arms, a steering tongue fitted to the main frame at the rear of the pivot posts, a pin on the link passing through a slot in the forwardly projecting tongue, a draught bar, a pin on the draught bar loosely engaged by the slot in the forward end of the pivoted tongue, a flexible connection between the offside end of the draught bar and the off-side of the main frame, and a connection between the near side end of the draught bar and the near side and rear part of the said main frame.

6. In a stripper harvester or reaper thresher machine, a main frame having longitudinal members on the near side thereof, a bracket fitted to the front end of the longitudinal members of the main frame, a bracket on the rear of a tractor, a universal coupling connecting the bracket on the main frame to the bracket on the rear of the tractor, a draught bar on the tractor, a flexible member connecting the inner end of the draught bar to the laterally projecting portion of the main frame, and a flexible connection between the near side end of the draught bar and the rear of the longitudinal portion of the main frame.

7. In a stripper harvester or reaper thresher machine, a main frame having longitudinal members on the near side thereof, a bracket fitted to the front end of the longitudinal members of the main frame, a bracket on the rear of a tractor, a universal coupling connecting the bracket on the main frame to the bracket on the rear of the tractor, a flexible coupling having its forward end connected to the offside of the tractor and its rear end connected to the offside of the main frame, and a draught member having its front end connected to the near side of the tractor and its rear end connected to the near side and rear part of the main frame, substantially as described.

In testimony that I claim the foregoing as my invention I have signed my name this 12th day of November, 1924.

FRANCIS FOGARTY.